Oct. 25, 1966    P. W. STRIPP ETAL    3,281,513
METHOD OF MANUFACTURING A FLUID FILTER
Filed Dec. 7, 1962    3 Sheets-Sheet 2
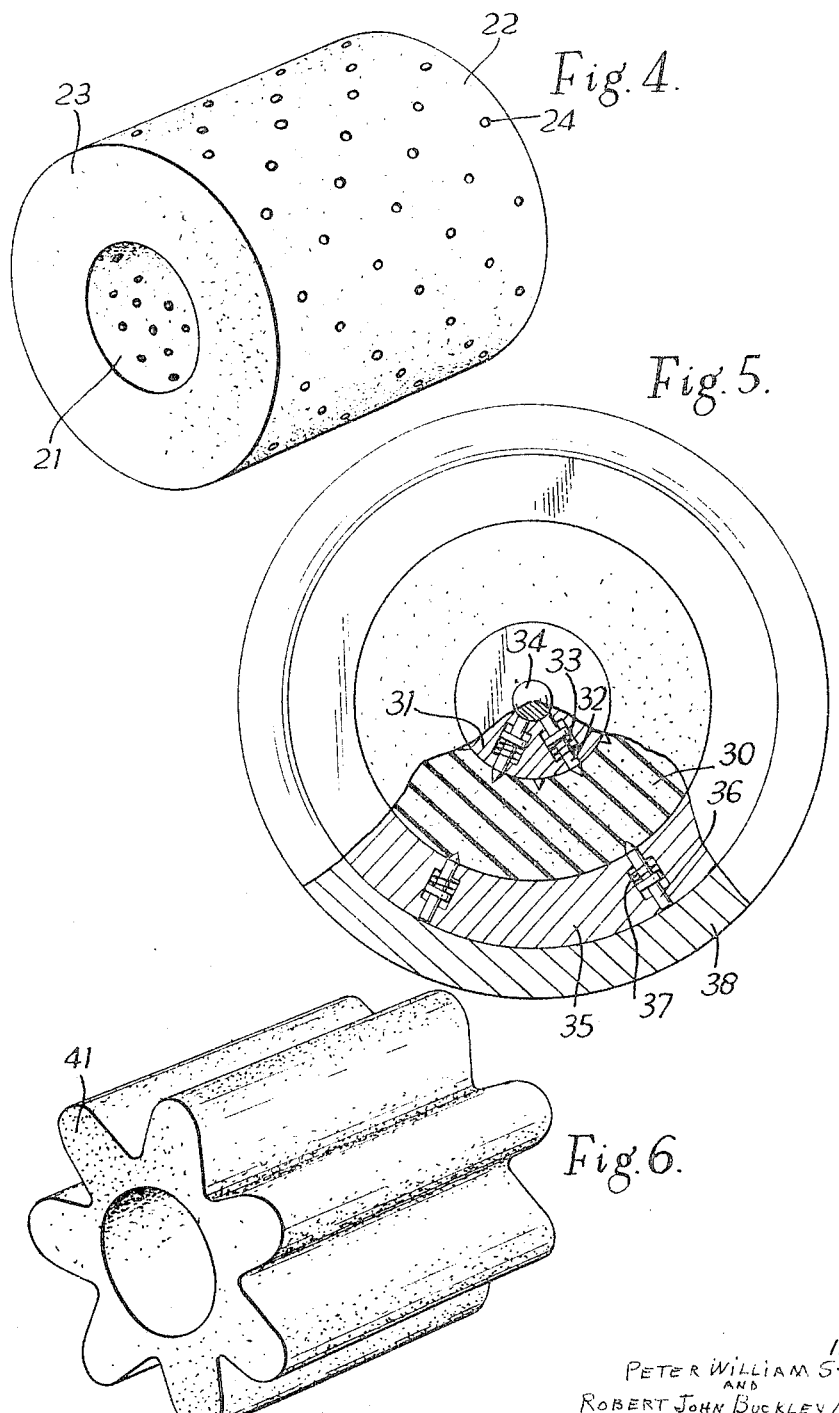
INVENTOR
PETER WILLIAM STRIPP
AND
ROBERT JOHN BUCKLEY MAYNE
BY MASON, KOLEHMAINEN,
RATHBURN & WYSS
ATTORNEY Oct. 25, 1966   P. W. STRIPP ETAL   3,281,513
METHOD OF MANUFACTURING A FLUID FILTER
Filed Dec. 7, 1962   3 Sheets-Sheet 3

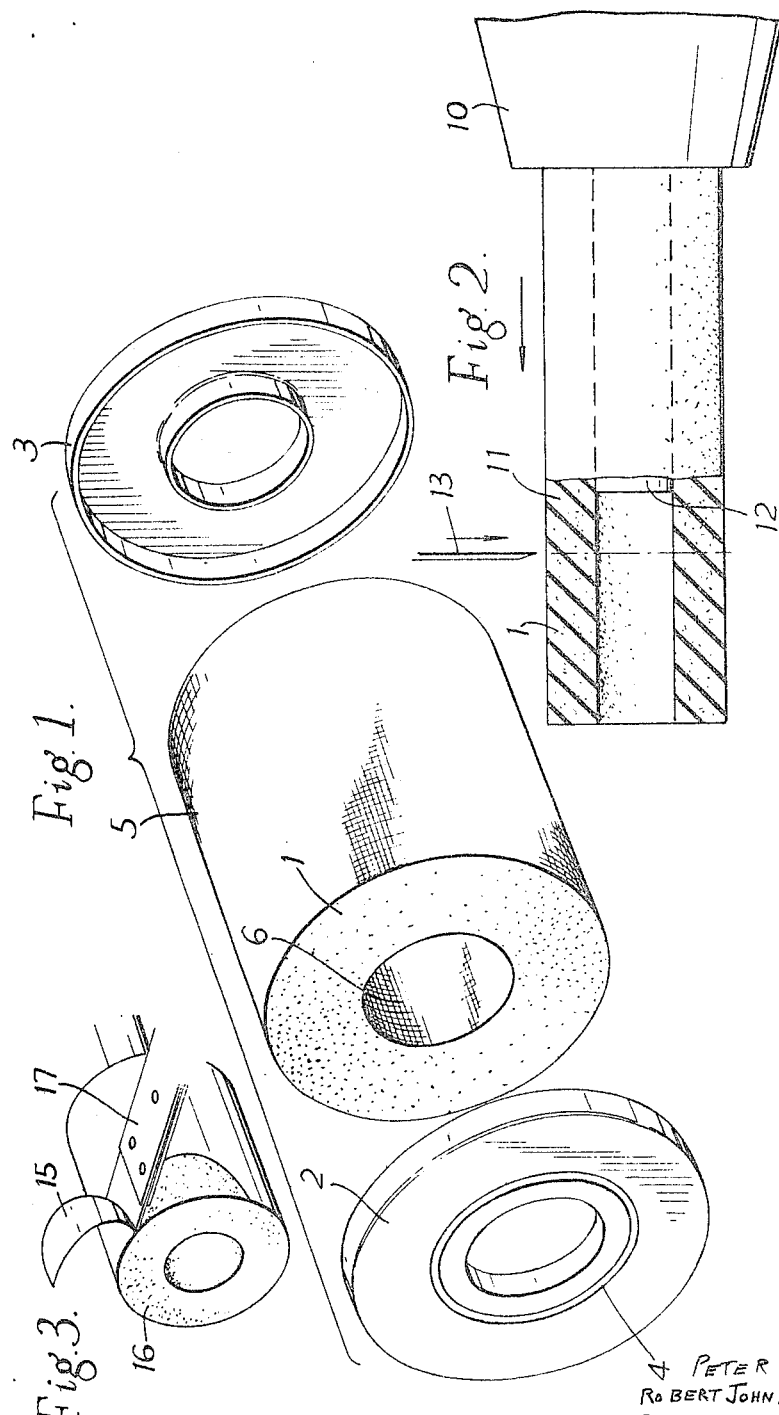

INVENTORS
PETER WILLIAM STRIPP
AND
ROBERT JOHN BUCKLEY MAYNE
BY MASON, KOLEHMAINEN,
RATHBURN & WYSS
ATTORNEYS

United States Patent Office 3,281,513
Patented Oct. 25, 1966

3,281,513
METHOD OF MANUFACTURING A FLUID FILTER
Peter William Stripp and Robert J. B. Mayne, Devon, England, assignors to Tecalemit (Engineering) Limited, Devon, England
Filed Dec. 7, 1962, Ser. No. 242,947
5 Claims. (Cl. 264—156)

This invention relates to a method of manufacturing a fluid filter and it is particularly concerned with the construction of filter elements such as are used for filtering gases of various kinds, including air cleaners such as are used in internal combustion engines. The invention is also applicable to filters for filtering liquids.

It is an object of the present invention to provide an improved method of constructing filter elements for fluid filters.

A further object of the invention is the provision of a method of constructing fluid filter elements which are formed of a foam material having pores which extend through it for the passage of the fluid being filtered, solid particles carried by the fluid being caught and retained by the foam material.

A still further object of the invention is to provide a method for the manufacture of such filter elements in which the undesirable effects of a relatively impervious skin, which tends to be formed when a foam material is produced, are prevented or overcome.

Yet another object of the invention is the provision of novel and improved method of manufacturing filter elements which are formed of filter material in the form of foam, while a still further object of the invention is the provision of novel and improved apparatus for use in the manufacture of such filter elements.

The invention, in one of its aspects, provides a method of making a fluid filter element, said method comprising extruding a foamable material so as to cause it to set and form a foamed mass of a section corresponding to that of the element required and having pores in it for the passage of the fluid being filtered, cutting from the extruded material a length corresponding to that of the element required and attaching to said length at least one support member which is adapted to direct the flow of said fluid through the foam material.

The invention further provides a method of manufacturing a fluid filter element comprising a core formed of a foam material having pores extending through it for the passage of the fluid being filtered, at least one support member secured to said core and arranged to direct the flow of fluid through said core, the foam material of said core having surfaces through which the fluid to be filtered passes, which are free, over parts at least of the areas thereof, from any skin formed during the production of said foam material liable seriously to interfere with the flow of fluid being filtered.

The said surfaces of the foam material may be entirely free from skin, any skin formed during the production of the foam material having been removed during the manufacture of the filter element, or if the surfaces do include a skin, this is broken or perforated to allow free flow of the fluid being filtered.

Perforation of such a skin may be effected using apparatus which represents a further feature of the invention and which comprises a pin-carrying member, a plurality of pins mounted in said member for movement between retracted positions and positions in which said pins project from said surface, means for moving said pins to their projecting positions to form perforations in the skin of a foam material located adjacent said pin carrying member and means for retracting said pins.

Further features and advantages of the invention will become apparent from the following description of a number of embodiments thereof. Reference will be made to the accompanying drawings, in which:

FIGURE 1 is an exploded view showing the parts of a filter element which may be constructed using the method and apparatus of the invention and which itself exemplifies the invention;

FIGURE 2 is a general view which shows, purely diagrammatically, certain steps in the construction of the element shown in FIGURE 1;

FIGURE 3 is a view showing purely diagrammatically how a skin formed on the extruded material may be removed;

FIGURE 4 is a general view showing the core of a filter element which has been produced by the process of the invention and in which a skin formed on the foam material has been punctured to allow the passage of the fluid being filtered;

FIGURE 5 is a sectional view showing diagrammatically one method and apparatus which may be used to perforate the skin when constructing the core shown in FIGURE 4;

FIGURES 6, 7, 8 and 9 are perspective views showing the cores of a number of other filter elements which may be produced in accordance with the invention.

Figure 7:
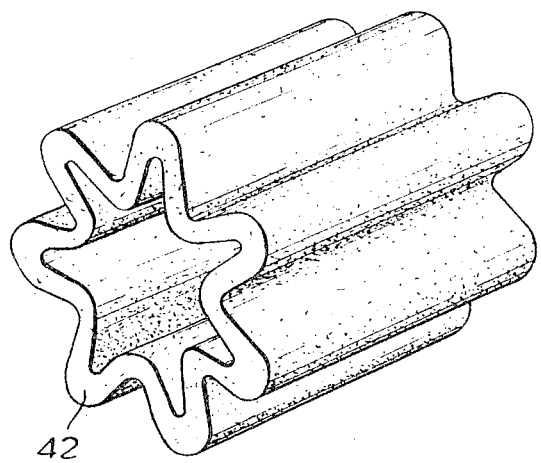

Referring first to FIGURE 1, the filter element shown comprises a core 1 in the form of a hollow cylinder which has been formed out of a suitable foam material by one of the methods which will be described hereinafter. For forming the core 1 it is necessary to use a material which will form a foam with pores of a suitable size to have the required filtering action and these pores must be of a kind which will provide for the passage of the fluid being filtered through the material of the core, while dust or other solid (or in certain cases liquid) particles carried by the fluid are retained by the foam material. It is also necessary that the material used for the core should be one which will not collapse or which can be prevented from collapsing while it is being extruded and before it has set. It is also necessary that the material used should be one which will not be undesirably affected by gases or liquids which contact it during use.

Amongst the possible materials which may be used it is preferred to use a polyurethane composition. Other materials include expanded polyamides, polyvinyl chloride compositions and polytetrafluoroethylene compositions. Synthetic and natural rubber can also be used, although natural rubber would only be suitable if the material is not likely to be contacted by oil during use.

Referring again to FIGURE 1, to form the filter element the core 1 is fitted between two end caps 2 and 3, which may be made of metal, card, a synthetic plastic or other suitable material and which are secured to the core in any convenient way. The end caps may, for example, be coated internally with an adhesive or cement or they could be secured by other suitable means. For example the end caps could be formed by moulding from a suitable synthetic plastic substance in such a way that the ends of the core 1 become embedded in the material of the end caps.

It is preferred that each end cap should be provided with a sealing ring or rib, such as the rib which is indicated at 4 in FIGURE 1. These sealing rings or ribs are intended to form fluid seals when the element is fitted in a filter casing to form the complete filter.

In the case of a moulded end cap the rib 4 may be formed integrally with the remainder of the cap. Alternatively a separate ring made of any suitable material may be attached to the end cap by an adhesive or other means.

In FIGURE 1, the core 1 is shown surrounded both externally and internally by cylinders or sleeves 5 and 6, respectively, which are formed of metal, a synthetic plastic or other suitable material which will allow the free passage of the fluid to be filtered. The sleeves may, for example be formed of wire gauze or of a perforated sheet metal or other material.

The ends of the sleeves 5 and 6 are secured to the end caps 2 and 3 when the latter are fitted, this preferably being done by the same means which secure the foam material to the end caps. The sleeves 5 and 6 serve a number of useful purposes. In particular they strengthen the filter element as a whole and provide protection for the filter material.

Although two such sleeves are shown in FIGURE 1, one inside and one outside the core 1, it will in some cases be preferred to fit only a single sleeve, which will normally be the outer sleeve 5.

Referring now to FIGURE 2, this shows diagrammatically how the core 1 may be produced by extrusion. The reference 10 indicates the nozzle of any suitable extrusion apparatus which is extruding a length 11 of a suitable foam material, such as a polyurethane composition. The nozzle is shown as being provided with a projecting core 12 which supports the extruded material while the latter is setting and assists in supporting it.

In order to form the core 1 a suitable length is cut from the extruded material, using any suitable cutting means such as is indicated purely diagrammatically at 13 in FIGURE 2. Such cutting means may be associated with or form part of the extrusion apparatus itself or quite separate cutting means may be used, when it is desired to construct filter elements from stored lengths of extruded material.

When many foam materials are produced there is a tendency for a skin to be formed on their exposed surfaces and this has been found to occur when the foam material is extruded. Such skins, although not usually completely impervious, do tend to block the pores in the foam material and they would thus prejudice the efficiency of the material when used for a filter. It is therefore one of the objects of the present invention to provide means for overcoming or reducing this effect.

According to one method the skin is removed completely by cutting it from the extruded material, or from a filter core which has been cut from the latter. This is illustrated diagramamtically in FIGURE 3, in which an outer skin, indicated at 15, is shown being cut from the outer surface of a filter core 16, using a paring knife or other suitable means indicated generally at 17. If a skin is also formed within the core 16 this may be removed in a similar way.

Instead of removing the skin or skins completely their effect on the filtering action can be overcome or reduced by perforating them, as is indicated in FIGURE 4. In this case the inner and outer skins 21 and 22 on a filter core 23 are shown pierced by a number of perforations or holes 24. This may be done in any suitable way and using any appropriate apparatus, but a preferred method and apparatus are illustrated diagrammatically in FIGURE 5.

In FIGURE 5 the reference 30 indicates, partly in transverse section, a filter core which is being produced and which is of hollow cylindrical form, similar to that shown in FIGURE 4. In order to perforate both the inner and outer skins of the core 30 inner and outer perforating devices are used.

The inner perforating device comprises a cylindrical pin-carrier member 31 which is adapted to fit closely inside the core 30 and which carries a number of perforating pins 32. Each of these pins is biased by means of a spring 33 into a retracted position, in which it is contained within the perimeter of the member 31 with its points retracted from the core 30. In this state the member 31 is introduced into the core 30.

The pins 33 are then pressed outwardly to perforate the inner skin of the core 30, which is done by means of an actuating member in the form of a rod 34. This rod 34 could be arranged to actuate the pins 32 in a number of ways. For example, one end of the rod could be tapered so that when it is introduced into the member 31 from one end of the latter the pins 33 are pressed outwardly into the positions shown by the longitudinal movement of the rod as it is introduced. Alternatively, the rod 34 could be formed with a number of individual inclined surfaces such that a small longitudinal or rotational movement of the rod within the member 31 will actuate all the pins 32 simultaneously.

For perforating the outer skin of the core 30 a pin-carrying member 35 of hollow cylindrical form is used, which is fitted so as closely to surround the core 30. The member 35 carries pins 36 which are retracted by springs 37 and which are adapted to be forced inwardly in order to perforate the outer skin by means of an actuating member 38 which is in the form of a hollow sleeve surrounding the member 35. The sleeve 38 may be formed with an internal taper or chamfer at one end such that fitting the sleeve over the member 34 forces the pins inwardly to perforate the skin, or, alternatively, the sleeve 38 may be formed with a number of inclined surfaces such that a small rotational or axial movement of the sleeve actuates the pins.

After the inner and outer skins of the core 30 have been perforated the perforating apparatus is removed from the core, to do which the actuating members 34 and 38 are first operated (or completely removed) to allow retraction of the pins, after which the pin-carrying members 31 and 35 are removed from the core.

As an alternative to removing or perforating the skin of a foam material a similar effect may be produced by using a reagent which will dissolve the material of the foam by chemical or other action. Such a reagent may be applied to the surface of the foam material by dipping, spraying or other means, allowed to remain on the surface for a time which is sufficient for it to act on the skin and then removed by washing or other means so as to leave the surface of the foam material substantially free of skin.

Although the invention has been more particularly described as applied to the construction of hollow cylindrical filter elements of circular cross-section, it is also applicable to the construction of filter elements of other kinds and examples of these are shown in FIGURES 6 to 9.

In FIGURE 6 a filter core 41 is shown which has a central passage of circular cross-section but which is star-shaped in its outer cross-section. Such a filter element is particularly intended to be used in such a way that the fluid passes from the outside to the inside of the filter core, rather than in the opposite direction, since an increased filtration area is obtained in the region where the fluid reaches the filter material and where most of the impurities are caught.

FIGURE 7 shows a filter core 42 which is similar in its external cross-section to the core 41 of FIGURE 6, but which in this case has an internal passage which is also of star-section. This provide the important advantage that the thicknes of the foam material through which the fluid passes is substantially uniform, while an increased filtration area is provided, as compared with filter elements of the types shown in FIGURES 1 and 4.

Figure 8:
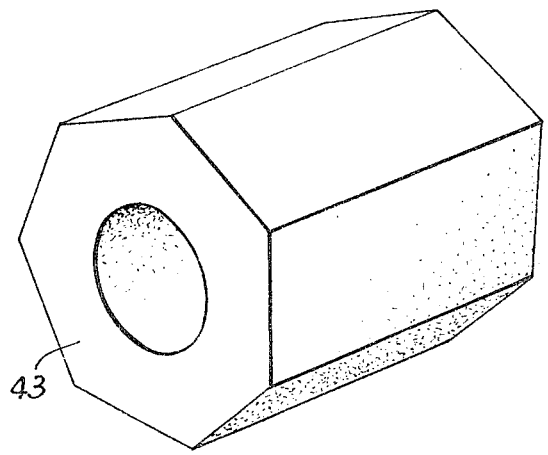
Figure 9:
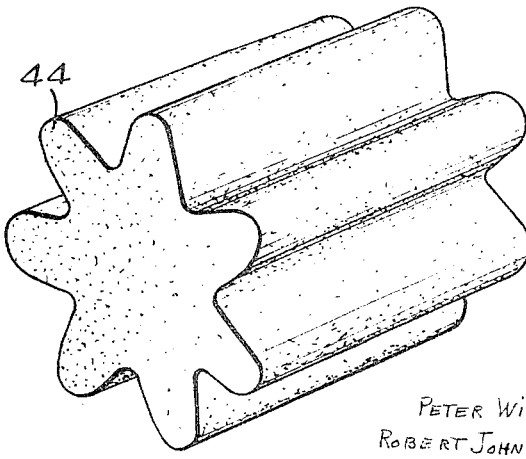

FIGURE 8 shows a filter core 43 which is similar to the core 41 of FIGURE 6 except that its outer surface is of plain polygonal cross-section.

The invention has been more particularly described as applied to the construction of hollow filter elements which are designed to be used with the fluid passing through the filter material in a generally radial direction, whether from the outside to the inside or vice versa. The invention is, however, also applicable to the construction of filter elements having cores of solid cross-section, one example of which is shown at 44 in FIGURE 9. Such a solid filter element must, of course, be used in a filter casing which is so designed that the fluid being filtered is made to pass through the foam material of the filter element or core. This it may do in any of a number of ways. The fluid may, for example, pass from one end of the core to the other (in which case the presence of a skin on the outer peripheral surface of the core will not matter) or it may enter the core at one end and leave it through the outer peripheral surface, or vice versa. The filter core could in fact be constructed in the form of a flat disc, such discs being cut from lengths of extruded material in a manner similar to that shown in FIGURE 2.

The solid core is fitted to a support (or supports) of appropriate shape; it may, for example, be attached to a support in the form of an end cap or disc and this latter may, if necessary, be formed with one or more openings for the passage of the fluid being filtered. A perforated plate, for example, could be used as a support.

One form of filter element could consist of a solid core of any suitable external cross-section (that shown in FIGURE 9 being preferred), which is attached to an end cap or disc formed with a central opening. Such a filter element would preferably be used in such a way that the fluid being filtered passes into the filter element through the outer exposed surfaces of the foam material and passes out through the opening in the cap or disc, since this provides a greater exposed surface area for filtration than if a reverse direction of flow were used.

It has been found that, in the case of filters for gases, such as for example air filters for internal combustion engines, which use a fibrous material for filtering purposes, a considerable increase in filtering efficiency can be obtained if the fibres are given a thin coating of a non-volatile liquid, such as oil. Such a coating can also be used with filters using foam material, such as have been herein described, provided that the filter material and the liquid are compatible and the foam is of a suitable porosity for its intended use.

We claim:
1. A method of making a fluid filter element comprising the steps of providing a foamed plastic tubular preform having open pores for the passage of a fluid to be filtered and relatively impervious skins on the inner and outer surfaces thereof; forming said preform into a length corresponding to that of the filter element required; and piercing at least one of said surface skins to provide a plurality of perforations through the skin only, rendering said one of said surface skins more pervious.

2. A method of making a fluid filter as defined in claim 1 above including the additional step of piercing the other of said surface skins to provide a plurality of perforations through the skin only, rendering said other of said surface skins more pervious.

3. A method of making a fluid filter element comprising the steps of providing a foamed plastic preform of a section corresponding to that of the element required having open pores for the passage of a fluid to be filtered and relatively impervious skin on the surface thereof; forming said preform into a length corresponding to that of the filter element required; aligning said filter element with a member carrying a plurality of piercing pins retracted into said member and having points adapted to be driven, upon extension therefrom, into said surface skin; pressing said pin points into said skin to perforate said skin rendering it more pervious to the flow of fluid; and withdrawing said points from said skin.

4. A method of making a fluid filter element as defined in claim 3 above wherein said surface skin is an exterior skin and wherein said aligning step includes positioning said filter element in said member.

5. A method of making a fluid filter element as defined in claim 3 above wherein said preform is hollow and said surface skin is interior skin and wherein said aligning step includes positioning said member in said hollow preform.

References Cited by the Examiner

UNITED STATES PATENTS

| | | | |
|---|---|---|---|
| 1,045,234 | 11/1912 | Willis et al. | 264—321 X |
| 1,292,182 | 1/1919 | Wedlock | 264—48 X |
| 1,299,210 | 4/1919 | Myers | 30—366 |
| 1,586,076 | 5/1926 | Dickey | 264—156 X |
| 1,898,027 | 2/1933 | Winslow | 55—510 X |
| 2,256,483 | 9/1941 | Johnston | 264—54 X |
| 2,346,201 | 4/1944 | Vautier | 264—321 X |
| 2,426,405 | 8/1947 | McDermott | 55—510 |
| 2,437,884 | 3/1948 | Maynard | 264—156 X |
| 2,570,055 | 10/1951 | Gasdia | 30—366 |
| 2,834,983 | 5/1958 | Norton | 18—14 |
| 2,857,625 | 10/1958 | Carlson | 264—53 |
| 2,898,626 | 8/1959 | Alderfer et al. | 264—47 |
| 2,966,960 | 1/1961 | Rochlin | 55—502 |
| 2,999,562 | 9/1961 | Lechtenberg | 55—502 |
| 3,011,218 | 12/1961 | Mitten | 264—47 |
| 3,091,998 | 6/1963 | Wehr et al. | 264—45 X |
| 3,121,760 | 2/1964 | Kline | 264—51 |
| 3,137,602 | 6/1964 | Lincoln | 264—150 X |
| 3,160,687 | 12/1964 | Andrews | 264—25 |
| 3,165,483 | 1/1965 | Gemeinhardt et al. | 260—2.5 |
| 3,165,787 | 1/1965 | Carmack | 264—156 X |
| 3,170,972 | 2/1965 | Knipp et al. | 264—54 X |
| 3,210,300 | 10/1965 | Leibu et al. | 260—2.5 |

FOREIGN PATENTS

| | | |
|---|---|---|
| 606,181 | 10/1960 | Canada. |
| 466,453 | 5/1937 | Great Britain. |
| 854,586 | 11/1960 | Great Britain. |
| 907,236 | 10/1962 | Great Britain. |

OTHER REFERENCES

Koppers booklet: "Dylite-expandable—polystyrene," c1954, page 20.

ALEXANDER H. BRODMERKEL, *Primary Examiner.*
HARRY B. THORNTON, GEORGE D. MITCHELL,
*Examiners.*
P. E. ANDERSON, *Assistant Examiner.*